United States Patent
Panhelleux (12)

(10) Patent No.: US 6,179,216 B1
(45) Date of Patent: Jan. 30, 2001

(54) METHOD FOR OPTIMIZING IRRIGATION IN CULTIVATED FIELDS USING A WATER GUN WITH HIGH FLOW RATE

(75) Inventor: Joël Panhelleux, La Meignanne (FR)

(73) Assignee: Perrot S.A. (FR)

( * ) Notice: Under 35 U.S.C. 154(b), the term of this patent shall be extended for 0 days.

(21) Appl. No.: 09/445,279
(22) PCT Filed: Jun. 3, 1998
(86) PCT No.: PCT/FR98/01114
§ 371 Date: Dec. 3, 1999
§ 102(e) Date: Dec. 3, 1999
(87) PCT Pub. No.: WO98/54951
PCT Pub. Date: Dec. 10, 1998

(30) Foreign Application Priority Data

Jun. 4, 1997 (FR) .................................................. 97 06868

(51) Int. Cl.[7] .............................. B05B 17/00; B05B 3/00; A01G 27/00; G05D 11/00
(52) U.S. Cl. ................................ 239/1; 239/69; 239/745; 700/284
(58) Field of Search .................................... 239/1, 67, 69, 239/745, 195–198; 700/28, 32, 33, 36, 284

(56) References Cited

U.S. PATENT DOCUMENTS 4,226,366 * 10/1980 Norton .................................... 239/69
5,020,730 * 6/1991 Perroud et al. ....................... 239/745
5,696,671 * 12/1997 Oliver ................................... 700/284

* cited by examiner

Primary Examiner—Andres Kashnikow
Assistant Examiner—Davis Hwu
(74) Attorney, Agent, or Firm—Michael Best & Friedrich LLP

(57) ABSTRACT

A method of optimizing the delivery of water to cultivated fields by means of a pivoting irrigation gun mounted on a moving carriage, the method consisting, for irrigating a field of length (L) and of width equal to twice the throw (P) of the gun:

in subdividing the irrigation zone into three successive zones, namely: a start-of-irrigation zone ($Z_D$), an intermediate zone ($Z_I$), and an end-of-irrigation zone ($Z_F$); and in irrigating the start-of-irrigation zone ($Z_D$) and/or the end-of-irrigation zone ($Z_F$) by performing at least one alternation of a pause during which the carriage is stationary and a displacement of the carriage at a predetermined speed over a distance corresponding to one throw of the gun, so as to optimize the delivery of water relative to the delivery supplied in the intermediate zone, by limiting the water deficits ($d_1$, $d_2$) at the beginning and at the end of irrigation.

14 Claims, 3 Drawing Sheets

METHOD FOR OPTIMIZING IRRIGATION IN CULTIVATED FIELDS USING A WATER GUN WITH HIGH FLOW RATE

The present invention relates to a method of optimizing water delivery to cultivated fields by means of a high flow rate water gun.

One of the techniques used for delivering water to large cultivated fields consist in using a high flow rate water gun pivotally mounted on a moving carriage. The gun is connected to the free end of a hose connected to a water supply source. The hose is initially wound on the support drum of a winder and a certain length thereof is unwound, after which the drum of the winder is caused to rotate so as to wind in the hose progressively, thereby pulling the carriage at substantially constant speed towards the winder while the gun delivers water by making successive sweeps over an angular sector of radius equal to the throw of the gun. In this way, it is theoretically possible to irrigate a field or a portion of a field over a length that is substantially equal to the length of the unwound hose and over a width corresponding to twice the throw of the gun.

The rate at which the hose is wound onto the drum of the winder or the travel speed of the carriage carrying the gun is determined as a function of the quantity of water that is to be delivered, which in turn is a function of the delivery rate of the gun.

A drawback inherent to that irrigation technique lies in insufficient water being delivered at the beginning and at the end of irrigation, even though an intermediate zone of the field receives overall the desired amount of water delivery. In the ideal case, the area that is irrigated would correspond to the area of the field that is to be irrigated, and also the area irrigated would receive water delivery that is as uniform as possible.

The object of the invention is to optimize this irrigation technique so as to minimize the deficit in water delivery at the beginning and at the end of irrigation, i.e. so as to tend towards the ideal of uniform water delivery over the entire irrigated area.

To this end, the invention provides a method of optimizing water delivery to cultivated fields by means of a high flow rate water gun, the method consisting in connecting the gun to the free end of a hose connected to a water supply source, in mounting the gun to pivot on a moving carriage, in unwinding the hose over a certain length from the drum of a winder so as to enable the gun to be moved away, and in rotating the drum so as to wind the hose in progressively and displace the carriage towards the drum while the gun is delivering water by performing successive sweeps over an angular sector of radius equal to one gun throw, the method being characterized in that it consists, for irrigating a field of length L and of width equal to twice the throw P of the gun:

in subdividing the irrigation zone into three successive zones, namely: a start-of-irrigation zone, an intermediate zone where the gun travels at a reference speed $V_e$ corresponding to the desired water delivery, and an end-of-irrigation zone; and in irrigating the start-of-irrigation zone and/or the end-of-irrigation zone by performing at least one alternation of a pause during which the carriage is stationary and a displacement of the carriage at a predetermined speed over a distance corresponding to one throw of the gun, or possibly vice versa in the end-of-irrigation zone, so as to optimize water delivery compared with the delivery supplied in the intermediate zone, i.e. so that the supply of water is as uniform as possible over the entire irrigated area.

In general, in order to limit water deficit in the start-of-irrigation zone, the method consists in performing alternations of pauses and displacements, such that:

the duration of each pause $T_i$ is defined using the equation:

$$T_i = \frac{2(n-i)+1}{2n} \times \frac{P}{V_e}$$

where:

$i$ lies in the range $[1,n]$;

$\underline{n}$ is the integer number of possible alternations, and is such that $\underline{n}$=the integer portion of $(V_{max}/V_e)$;

$V_{max}$ is the maximum speed at which the hose can be wound in;

$V_e$ is the reference speed of displacement for the carriage corresponding to the desired water delivery;

P is the throw of the gun; and each displacement speed $V_i$ of the carriage, after a pause, is defined from the equation:

$$V_i = n/i \times V_e$$

While the start-of-irrigation zone is being irrigated under the above-specified conditions, the gun can be pointed in the travel direction of the carriage or in an opposite direction.

In general, in order to limit water deficit in the end-of-irrigation zone, the method consists in performing alternations of pauses and displacements or vice versa, such that:

the duration of each pause $T_i$ is defined by the equation:

$$T_i = \frac{2i-1}{2n} \times \frac{P}{V_e}$$

and each displacement speed $V_i$ of the carriage after a pause is defined by the equation:

$$V_i = \frac{n}{(n-i+1)} \times V_e$$

Specifically, the end-of-irrigation zone can be irrigated using various different approaches.

In a first approach, the method consists in performing alternations of pauses and displacements, the gun being pointed in the displacement direction of the carriage during the pauses and in the opposite direction during the displacements of the carriage, the carriage being displaced all the way to the end of the end-of-irrigation zone.

In this first approach and in order to tend towards uniform water delivery over the entire irrigated area, the start-of-irrigation zone and the intermediate zone are irrigated by pointing the gun in the opposite direction to the carriage displacement direction. In which case, the winder is placed at one end of the field, and the hose is unwound over a length (L–P) so as to position the carriage at the distance of one gun throw from the other end of the field.

In a second approach, the method consists in causing the end-of-irrigation zone to begin at (n+1) gun throws from the end of the field, in causing the carriage to be displaced at a speed $(V_1)$ during the first throw, then causing alternations of displacements and pauses $(V_2, T_1; V_3, T_2; \ldots, V_n, T_{n-1})$ to be performed, the gun pointing in the displacement direction of the carriage during the displacements thereof and in an opposite direction during the pauses, and in terminating by a pause $(T_n)$ once the carriage has reached one gun throw from the end of the end-of-irrigation zone with the gun pointing in the carriage displacement direction.

In this second approach and in order to tend towards uniform water delivery over the entire irrigated area, the start-of-irrigation zone and the intermediate zone are irrigated by pointing the gun in the carriage displacement direction. In which case, the winder is placed at a distance of one gun throw from one end of the field, and the hose is unwound to a length of (L−P) so as to position the carriage at the other end of the field.

In a third approach that is valid only if $\underline{n}$ is not less than 2, the method consists in performing alternations of displacements and pauses ($V_1, T_1; V_1, T_2; \ldots; V_n, T_n$) the gun being pointed in the direction opposite to the displacement direction of the carriage both during the displacements thereof and during the pauses, while the displacement of the carriage during the first alternation takes place with the gun pointing in the displacement direction of the carriage, the displacement speeds ($V_1$ and $V_2$) during the first two alternations being such that:

$$V_1 = V_2 = \frac{2n}{n-1} \times V_e$$

At the end of irrigation, the gun is situated at the end of the end-of-irrigation zone.

In this third approach, and in order to tend towards uniform water delivery over the entire irrigated area, the start-of-irrigation zone and the intermediate zone are irrigated by pointing the gun in the carriage displacement direction. In which case, the winder is placed at one end of the field and the hose is unwound over a length L so as to bring the carriage to the other end of the field. This third approach gives better results than the preceding approaches, but it requires the hose to be unwound over the full length of the field, whereas the first two approaches save on a length of hose equal to one throw of the gun.

Other advantages, characteristics, and details of the invention appear from the following explanatory description made with reference to the accompanying drawings, given solely by way of example, and in which.

Figure 5A:
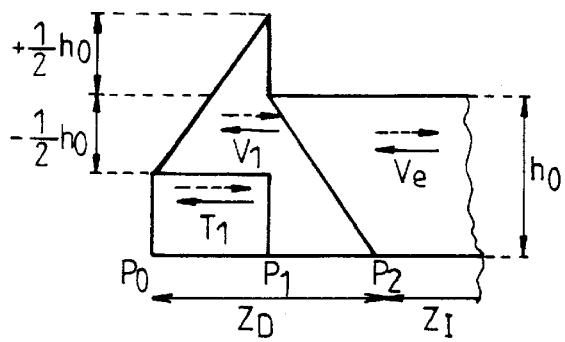
Figure 5B:
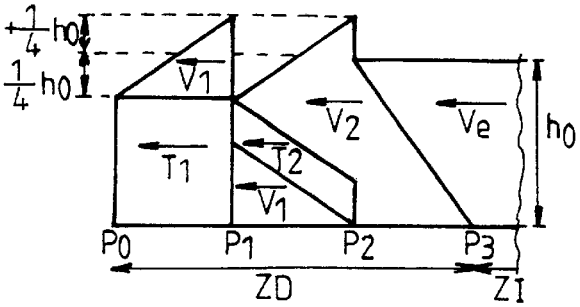
Figure 5C:
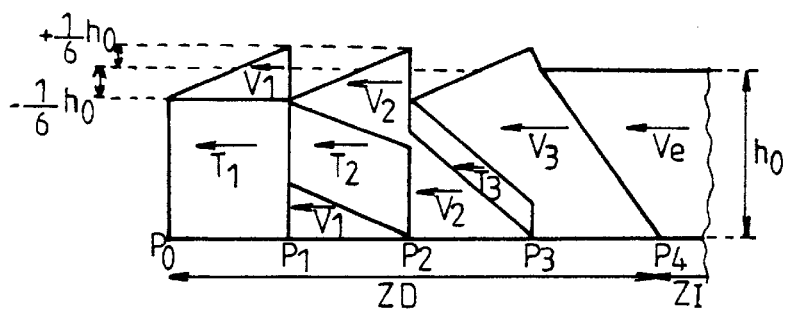

FIGS. 5a to 5c to show the water delivery profile provided by the gun in the start-of-irrigation zone of a field when applying the method of the invention; and FIGS. 6a to 6d, 7, and 8 show the water delivery profile in the end-of-irrigation zone of a field in application of three different approaches of the method of the invention.

Figure 1:
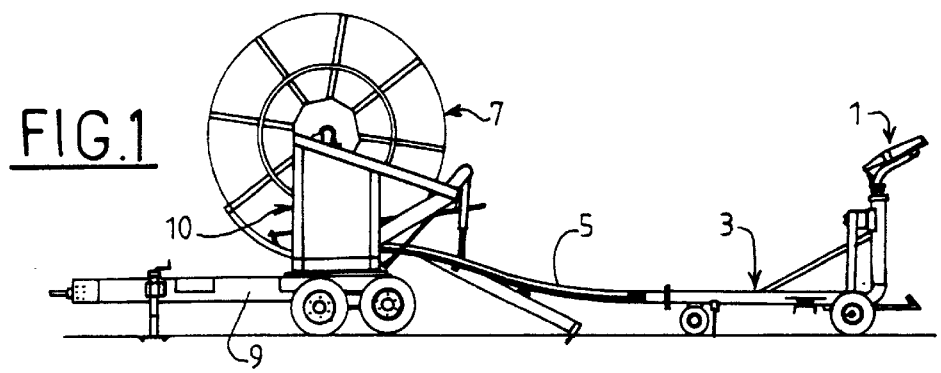
FIG. 1 is a diagrammatic view of a winder used in the irrigation technique mentioned in the introduction.

The irrigation technique mentioned in the introduction is implemented by a system as shown in FIG. 1. A water gun 1 is pivotally mounted on a carriage 3 and is connected to the end of a hose 5 which is wound onto the drum support of a winder 7 which is itself carried on a trailer 9, for example. The other end of the hose 5 is connected to a water supply and a turbine unit 10 as fixed on the trailer 9 is interposed.

Figure 2:
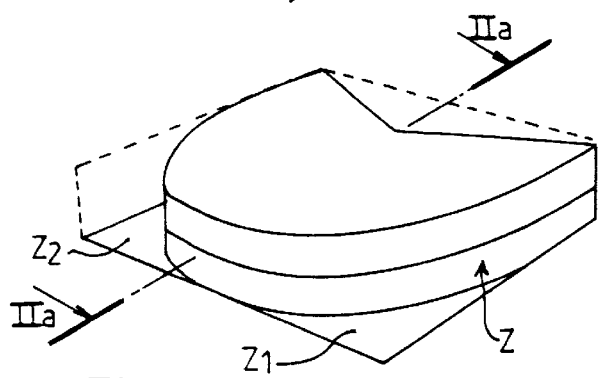
FIG. 2 is a perspective view showing the ideal profile for water delivery by a pivoting water gun.
Figure 2A:
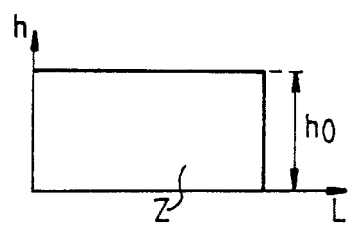
FIG. 2a is a section view on line IIa—IIa of FIG. 2.

With the carriage 3 assumed to be stationary, the pivoting water gun can deliver water in successive sweeps over an angular sector covering an angle of up to 230° and of radius equal to the throw of the gun 1, as shown in idealized manner in FIGS. 2 and 2a. The irrigated zone Z is assumed overall to receive the same quantity of water to a depth $h_0$, given that a water deficit is inevitable in the corner zones $Z_1$ and $Z_2$.

Figure 3:
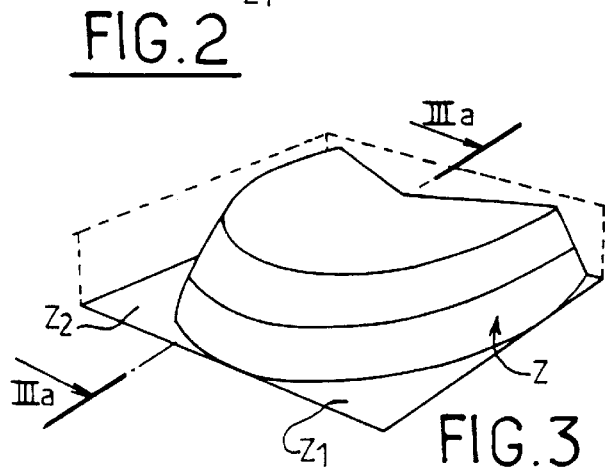
FIG. 3 is a perspective view similar to that of FIG. 2 but closer to a real irrigation profile.
Figure 3A:
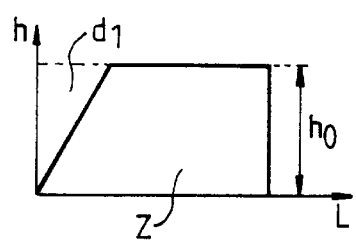
FIG. 3a is a section view on line IIIa—IIIa of FIG. 3.

In reality, the water delivery profile as actually obtained is closer to that shown in FIGS. 3 and 3a where there can be seen a water deficit $d_1$ at the start of the irrigated zone Z, in addition to the deficit in the corner zones $Z_1$ and $Z_2$.

Specifically, to irrigate a field that is substantially rectangular, of length L, and of width equal to twice the throw P of the gun 1, the hose is unwound over a length (L−P) so as to position the carriage at a point $P_1$ situated at a distance of one throw of the gun from the other end $P_0$ of the field, and thereafter the winder 7 is rotated so as to pull the carriage towards the winder and as far as the winder while the gun delivers water in successive sweeps by being pointed in a direction opposite to the direction in which the carriage is displaced, i.e. the angular sector irrigated by the gun is situated behind the carriage relative to the displacement direction of the carriage.

Figure 4:
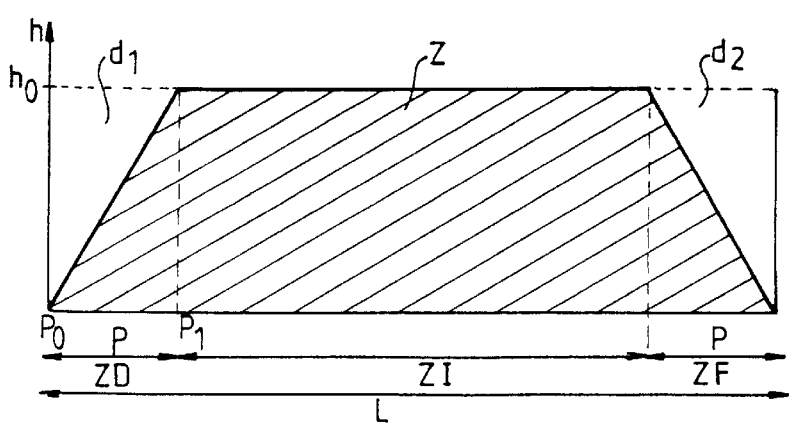
FIG. 4 is a diagrammatic section view to show the water delivery profile when the gun is displaced by means of a carriage along a field, while applying the irrigation technique mentioned in the introduction.

The water delivery profile in the irrigated zone Z using that technique is illustrated in FIG. 4, and it can be seen that this irrigated zone Z can be subdivided into three successive zones:

a start-of-irrigation zone $Z_D$ which extends over one throw P of the gun and in which there is a water deficit $d_1$ compared with the desired amount of water delivery which corresponds to a depth $h_0$;

an intermediate zone $Z_I$ which receives overall the desired amount of water to a depth $h_0$; and an end-of-irrigation zone $Z_F$ extending over one gun throw and for which there is a water deficit $d_2$ relative to the desired amount of water delivery.

The profile shown in FIG. 4 could also be obtained if the gun were to be pointed in the same direction as the direction in which the carriage moves, i.e. if the angular sector irrigated by the gun were situated ahead of the carriage relative to the carriage displacement direction. Under such circumstances, the carriage must begin irrigation by being positioned at one end of the field.

To mitigate the water deficit $d_1$ in the start-of-irrigation zone $Z_D$, the irrigation method of the invention can be implemented using an irrigation system of the type shown diagrammatically in FIG. 1.

In general, the method consists in alternating between pauses and displacements ($T_1, V_1; T_2, V_2; \ldots, T_n, V_n$) within the start-of-irrigation zone $Z_D$ so as to ensure that:

the duration of each pause $T_i$ is defined using the equation:

$$T_i = \frac{2(n-i)+1}{2n} \times \frac{P}{V_e} \tag{1}$$

where:

$\underline{i}$ lies in the range [1,n];

$\underline{n}$ is the integer number of possible alternations, and is such that $\underline{n}$= the integer portion of ($V_{max}/V_e$);

$V_{max}$ is the maximum speed at which the hose can be wound in;

P is the throw of the gun;

$V_e$ is the reference speed of displacement for the carriage corresponding to the desired water delivery; and each displacement speed $V_i$ of the carriage, after a pause, is defined from the equation:

$$V_i = n/i \times V_e \quad (2)$$

FIG. 5a shows the water delivery profile obtained in the start-of-irrigation zone $Z_D$ by applying the irrigation method of the invention using a single alternation of pause and displacement (n=1). Initially, the carriage is positioned at the point $P_1$ situated at the distance of one gun throw from the end of the field which is marked as point $P_0$, and the gun is pointed in the opposite direction to the carriage displacement direction.

By convention, the direction of the arrows situated above the parameters V and T in the drawings show the direction in which the gun is pointing, given that the displacement direction of the carriage is always from left to right in the drawings.

With the carriage stationary at point $P_1$, a pause $T_1$ is implemented such that $T_1 = \frac{1}{2}(P/V_e)$, giving the parameters $\underline{n}$ and $\underline{i}$ the value 1 in equation (1) so as to provide a first delivery of water between the points $P_0$ and $P_1$. Once this pause $T_1$ has elapsed, the carriage is moved at the speed $V_1 = V_e$, while giving the parameters $\underline{n}$ and $\underline{i}$ the value 1 in equation (2), and it is moved over a distance equal to the throw P of the gun so as to reach point $P_2$. During this displacement, the gun delivers additional water between the points $P_0$ and $P_1$, and begins to deliver water between the points $P_1$ and $P_2$. As from point $P_2$, the carriage is displaced at the speed $V_e$ so as to deliver additional water between the points $P_1$ and $P_2$ up to the depth $h_0$, and so as to deliver water to the depth $h_0$ throughout the intermediate zone $Z_I$.

An examination of FIG. 5a shows that the water deficit $d_1$ of FIG. 4 has been greatly reduced at the beginning of the start-of-irrigation zone $Z_D$, but that too much water has been delivered at the end of the start-of-irrigation zone.

The irrigation method of the invention is such that the water delivered in the deficit zones at the start of irrigation $Z_D$ and at the end of irrigation $Z_F$ is equal to $\pm(1/2) \times h_0$.

Thus, by performing only one pause and displacement alternation (n=1), the water delivered in the start-of-irrigation zone $Z_D$ varies over a depth ($\pm h_0/2$) relative to the desired depth $h_0$.

It should also be observed that the start-of-irrigation zone $Z_D$ is shown in FIG. 5a for the case when one alternation extends between the points $P_0$ and $P_2$, unlike the case shown in FIG. 4 where it extends between the points $P_0$ and $P_1$. The start-of-irrigation zone $Z_D$ extends over a length which is multiple of the throw P of the gun and is such that:

$$Z_D = (n+1) \times P$$

in order to limit the deficit $d_1$ in water delivery in said start-of-irrigation zone $Z_D$.

The water delivery profile using two alternations is shown in FIG. 5b (n=2).

The carriage is stopped at point $P_1$ for a first pause $T_1 = (3/4) (P/V_e)$, giving the parameter $\underline{n}$ the value 2 and the parameter $\underline{i}$ the value 1 in equation (1), so as to begin delivering water between the points $P_0$ and $P_1$. Thereafter, the carriage is displaced at the speed $V_1 = 2 \times V_e$ with i=1, and n=2 in equation (2), over a distance corresponding to one throw of the gun so as to bring the carriage to point $P_2$, thereby delivering additional water between points $P_0$ and $P_1$, and beginning to deliver water between points $P_1$ and $P_2$. When the carriage reaches point $P_2$, a second pause is performed $T_2 = (1/4) (P/V_e)$ to continue delivering water between the points $P_1$ and $P_2$. After this pause, the carriage is again displaced at a speed $V_2 = V_e$ over a distance equal to the throw P of the gun so as to bring the carriage to point $P_3$, thereby delivering additional water between the points $P_1$ and $P_2$, and beginning to deliver water between the points $P_2$ and $P_3$. Thereafter, the carriage is displaced at the reference speed $V_e$ so as to finish off delivering water between the points $P_2$ and $P_3$ and so as to deliver water to the desired depth $h_0$ in the intermediate zone $Z_I$.

In this way, by performing two pause-and-displacement alternations, it can be seen that the water delivered in the start-of-irrigation zone $Z_D$ varies only over a depth of $\pm h_0/4$ relative to the desired depth of water $h_0$, i.e. that the maximum difference has been reduced by 50% compared to the case where only one pause-and-displacement alternation is performed.

The water delivery profile using three alternations is shown in FIG. 5c (n=3).

In this case, a first pause is performed $T_1 = (5/6) (P/V_e)$ at point $P_1$, a first displacement of the carriage is performed at $V_1 = 3V_e$ between the points $P_1$ and $P_2$, a second pause is performed $T_2 = (3/6) (P/V_e)$ at point $P_2$, the carriage is displaced a second time at a speed $V_2 = (3/2) (V_e)$ between the points $P_2$ and $P_3$, a third pause is performed $T_3 = (1/6) (P/V_e)$ at the point $P_3$, and the carriage is moved a third time at a speed $V_3 = V_e$ between the points $P_3$ and $P_4$.

With three alternations, the water delivered in the start-of-irrigation zone $Z_D$ varies by no more than a depth of $\pm h_0/6$ relative to the desired depth of water $h_0$. In other words, the greater the number of alternations, the more the delivery of water in the start-of-irrigation zone $Z_D$ is optimized, it nevertheless being understood that this number $\underline{n}$ has a limit value which depends on the maximum speed $V_{max}$ at which the carriage can move.

The explanations given above remain unchanged if, at the beginning of irrigation, the gun points in the displacement direction of the carriage. This variant is represented by the dashed line arrows in FIG. 5a, it being understood that the gun then needs to be placed at the end of the field and not at one gun throw from said end.

To mitigate the water deficit $d_2$ in the end-of-irrigation zone $Z_F$ of the field to be irrigated, the irrigation method of the invention consists in alternating pauses and displacements, or vice versa, such that:

the duration of each pause $T_i$ is defined by the equation:

$$T_i = \frac{2i-1}{2n} \times \frac{P}{V_e} \quad (2)$$

and each displacement speed $V_i$ of the carriage after a pause is defined by the equation:

$$V_i = \frac{n}{(n-i+1)} \times V_e \quad (4)$$

The delivery of water in the end-of-irrigation zone $Z_F$ can be performed using various approaches.

In a first approach, alternating pauses and displacements $(T_1, V_1; T_2, V_2; \ldots, T_n, V_n)$ are performed and it is assumed that the intermediate zone $Z_I$ has been irrigated with the gun pointing in the opposite direction to the displacement direction of the gun. In this first approach, the end-of-irrigation zone $Z_F$ begins at $\underline{n}$ throws P before the end of the field. The water delivery profile obtained using three alternations is illustrated in FIGS. 6a to 6d (n=3). In this example, the end-of-irrigation zone $Z_F$ begins at point $P_1$ which is situated at a distance of three throws P defined between points $P_1$, $P_3$, $P_3$, and $P_4$, measured from the end of the field which is defined by the point $P_4$.

Figure 6A:
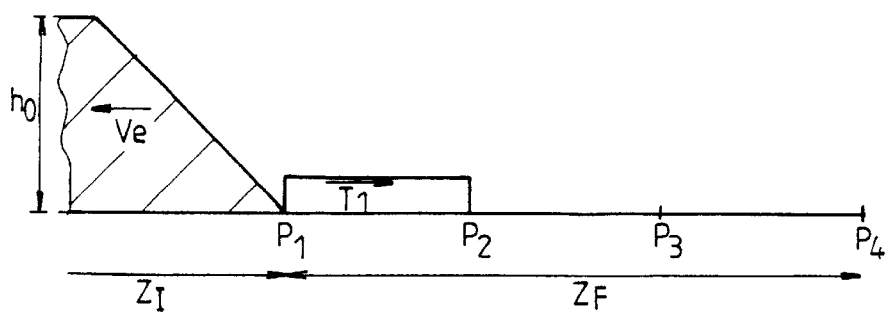
Figure 6B:
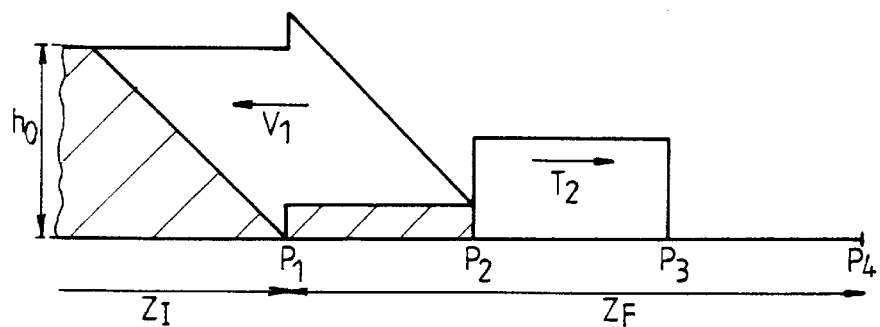
Figure 6C:
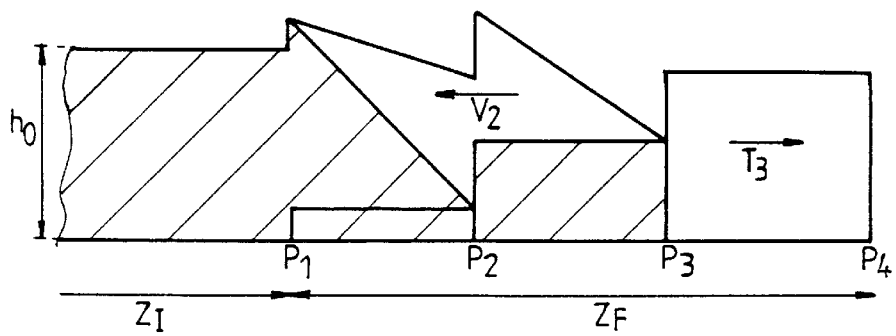
Figure 6D:
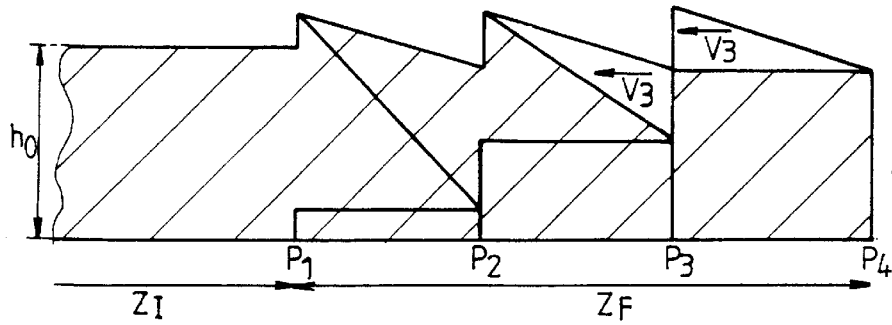

When the carriage reaches the point $P_1$, a first pause $T_1$ of duration $(1/6)$ $(P/V_e)$ is performed, giving the parameter $\underline{n}$ the value 3 and the parameter $\underline{i}$ the value 1 in equation (3), with the gun pointing in the displacement direction of the carriage (FIG. 6a) so as to begin delivering water between points $P_1$ and $P_2$. Thereafter, the carriage is displaced from point $P_1$ to point $P_2$ at a speed $V_1=V_e$, giving the parameter $\underline{n}$ the value 3 and the parameter $\underline{i}$ the value 1 in equation (4), with the gun pointing in the direction opposite to the displacement direction of the carriage so as to continue delivering water between the points $P_1$ and $P_2$ (FIG. 6b). When the carriage reaches point $P_2$, a second pause is performed for a duration $T_2=(3/6)/(P/V_e)$ giving the parameter $\underline{n}$ the value 3 and the parameter $\underline{i}$ the value 2 in equation (3), and pointing the gun in the displacement direction of the carriage (FIG. 6b) so as to begin delivering water between the points $P_2$ and $P_3$. The carriage is then displaced from point $P_2$ to point $P_3$ at a speed $V_2=(3/2)/(V_e)$, giving the parameter $\underline{n}$ the value 3 and the parameter $\underline{i}$ the value 2 in equation (4), and pointing the gun in the direction opposite to the displacement direction of the carriage so as to finish off delivering water between the points $P_1$ and $P_2$ and so as to continue to bring water between the points $P_2$ and $P_3$. When the carriage reaches the point $P_3$, a third pause of duration $T_3=(5/6)$ $(P/V_e)$ is performed giving the parameters $\underline{n}$ and $\underline{i}$ the value 3 in equation (3), and pointing the gun in the carriage displacement direction (FIG. 6c) so as to begin delivering water between the points $P_3$ and $P_4$. Finally, the direction in which the gun is pointing is reversed and the carriage is displaced from point $P_3$ to point $P_4$ marking the finish of the end-of-irrigation zone $Z_F$ at a speed $V_3=3V_e$ (FIG. 6d), giving the parameters $\underline{n}$ and $\underline{i}$ the value 3 in equation (4), so as to finish off delivering water between the points $P_2$ and $P_4$.

In this first approach for mitigating the water deficit $d_2$ in the end-of-irrigation zone $Z_F$ of the field, the gun always points in the carriage displacement direction during the pauses and in the opposite direction while the carriage is moving, it being understood that the intermediate zone of the field has already been irrigated with the gun pointing in the direction opposite to the displacement direction of the carriage.

With three pause-and-displacement alternations, the delivery of water in the end-of-irrigation zone $Z_F$ varies only over a depth of $\pm h_0/6$ relative to the desired depth of water $h_0$, whereas the variation would have been $\pm h_0/4$ if two alternations had been performed.

Thus, in order to tend towards uniform delivery of water over the entire irrigated area by applying this first approach, the start-of-irrigation zone $Z_D$ and the intermediate zone $Z_I$ are irrigated with the gun pointing in the direction opposite to the displacement direction of the carriage. Under such circumstances, the winder is placed at one end of the field, and the hose is unwound at the beginning of irrigation for a length (L–P) so as to position the carriage at a distance of one gun throw from the other end of the field. Under such conditions, the method makes it possible to limit the water deficit $d_1$ and $d_2$ in the start-of-irrigation zone and in the end-of-irrigation zone, and to deliver a little water into the corner zones $Z_1$ and $Z_2$ situated in the end-of-irrigation zone $Z_F$.

Figure 7:
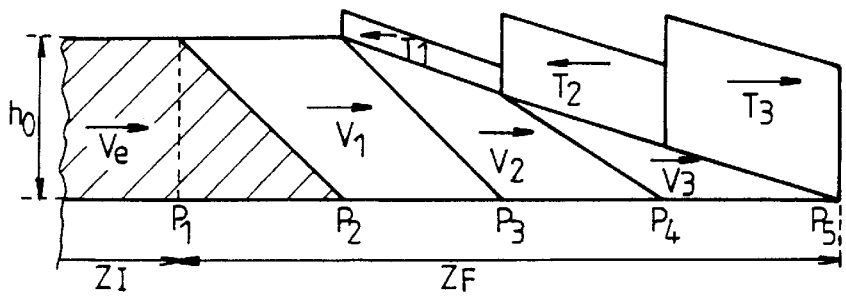

In a second approach, the method consists in causing the end-of-irrigation zone $(Z_F)$ to begin at $(n+1)$ gun throws from the end of the field, in causing the carriage to move at the speed $(V_1)$ in the first throw, then in performing alternating displacements and pauses $(V_2, T_1; V_3, T_2; \ldots, V_n, T_{n-1}$, the gun pointing in the displacement direction of the carriage during displacements thereof and in an opposite direction during pauses, and in terminating with a pause $(T_n)$ when the carriage has reached one gun throw from the end of the end-of-irrigation zone, with the gun pointing in the displacement direction of the carriage. The water delivery profile obtained with three alternations is illustrated in FIG. 7.

The end-of-irrigation zone $Z_F$ begins at the point $P_1$ which is situated at a distance of four throws P, as defined between the points $P_1$ to $P_5$, from the end of the field which is defined by the point $P_5$.

On reaching the point $P_1$, the carriage is displaced at a speed $V_1=V_e$, giving the parameter $\underline{n}$ the value 3 and the parameter $\underline{i}$ the value 1 in equation (4) so as to finish off delivering water between the points $P_1$ and $P_2$ and so as to begin delivering water between the points $P_2$ and $P_3$. From point $P_2$, the carriage is displaced at a speed $V_2=(3/2)$ $(V_e)$ giving the parameter $\underline{n}$ the value 3 and the parameter $\underline{i}$ the value 2 in equation (4), to continue delivering water between the points $P_2$ and $P_3$, and to begin delivering water between the points $P_3$ and $P_4$. At point $P_3$, the carriage is caused to stand still and a first pause is performed on duration $T_1=(1/6)$ $(P/V_e)$, giving the parameter $\underline{n}$ the value 3 and the parameter $\underline{i}$ the value 1 in equation (3), and reversing the direction in which the gun points so as to finish off delivering water between the points $P_2$ and $P_3$. The carriage is then moved from point $P_3$ to point $P_4$ at a speed $V_3=3\times V_e$, giving the parameters $\underline{n}$ and $\underline{i}$ the value 3 in equation (4) and pointing the gun in the displacement direction of the carriage so as to continue delivering water between the points $P_3$ and $P_4$, and begin delivering water between the points $P_4$ and $P_5$. At point $P_4$, the carriage is stopped and a second pause of duration $T_2=(3/6)$ $(P/V_e)$ is performed, giving the parameter $\underline{n}$ the value 3 and the parameter $\underline{i}$ the value 2 in equation (3), and reversing the direction in which the gun points so as to finish off delivering water between the points $P_3$ and $P_4$. Finally, with the carriage still stationary at the point $P_4$, a third pause of duration $T_3=(5/6)$ $(P/V_e)$ is performed, giving the parameters $\underline{n}$ and $\underline{i}$ the value 3 in equation (3), with the direction in which the gun is pointing being reversed so as to finish off delivering water between the points $P_4$ and $P_5$.

In this example, it will be observed that the carriage has not gone all the way to the point $P_5$ marking the finish of the end-of-irrigation zone $Z_F$, but has been stopped at point $P_4$ which is situated at a distance of one gun throw from the point $P_5$.

In this second approach for mitigating the water deficit $d_2$ in the end-of-irrigation zone $Z_F$ of the field, the gun always points in a displacement direction of the carriage while it is being displaced, and the gun points in the opposite direction to the displacement direction of the carriage during the first (n–1) pauses.

With three displacement-and-pause alternations, the delivery of water in the end-of-irrigation zone $Z_F$ varies only by a depth of $(\pm h_0/6)$ relative to the desired depth of water $h_0$, whereas the variation would have been $(\pm h_0/4)$ if only two alternations had been performed.

Thus, in order to tend towards uniform delivery of water over the entire irrigated area by applying this second approach, the start-of-irrigation zone and the intermediate zone are irrigated with the gun pointing in the displacement direction of the carriage. Under such circumstances, the winder is placed at a distance of one gun throw from one end of the field, and the hose is unwound over a length (L–P) so as to position the carriage at the other end of the field. Under such conditions, the method makes it possible to limit water deficits $d_1$ and $d_2$ in the start-of-irrigation zone and the end-of-irrigation zone of the field, and enables a medium delivery of water to be provided in the corner zones $Z_1$ and $Z_2$ situated in the start-of-irrigation zone $Z_D$.

Figure 8:
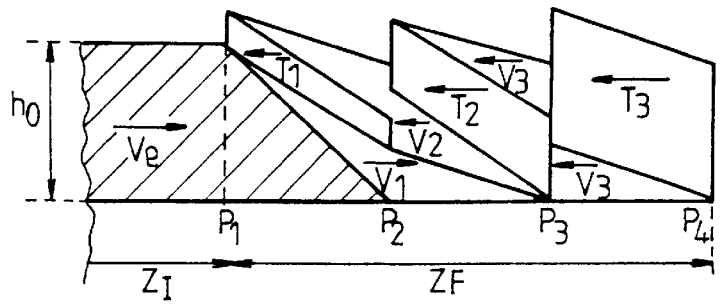

In a third approach with $n$ equal to at least two, displacement and pause alternations $(V_1, T_1; V_2, T_2; \ldots, V_n, T_n)$ are performed, and it is assumed that the intermediate zone $Z_I$ is irrigated with the gun pointing in the displacement direction of the carriage. The water delivery profile obtained with three alternations is shown in FIG. 8 (n=3).

The end-of-irrigation zone $Z_F$ begins at point $P_1$ which is situated at a distance of $n$ throws P from the end of the field as defined by a point $P_4$, i.e. it is at a distance of three throws defined between the points $P_1$ and $P_4$.

On reaching point $P_1$, the carriage is moved at speed $V_1$ so as to continue delivering water between the points $P_1$ and $P_2$ and so as to begin delivering water between the points $P_2$ and $P_3$.

This speed $V_1$ is such that:

$$V_1 = \frac{2n}{n-1} \times V_e = 3 \times V_e$$

The carriage is stopped at point $P_2$ and a first pause $T_1$ is performed to continue delivering water between the points $P_1$ and $P_2$ with the direction in which the gun is pointing being reversed. Thereafter, the carriage is moved from point $P_2$ to point $P_3$ at a speed $V_2=V_1=3\times V_e$ to finish off delivering water between the points $P_1$ and $P_2$, and to continue delivering water between the points $P_2$ and $P_3$, the gun continuing to point in the opposite direction to the carriage displacement direction until the end of irrigation. The carriage is stopped at point $P_3$ and a second pause $T_2$ is performed to continue to deliver water between the points $P_2$ and $P_3$, and then the carriage is displaced to point $P_4$ at the speed $V_1=3\times V_e$ so as to finish off delivering water between the points $P_2$ and $P_3$, and so as to begin delivering water between the points $P_3$ and $P_4$. Finally, a last pause $T_3$ is performed so as to finish off delivering water between the points $P_3$ and $P_4$.

With three pause-and-displacement alternations, the delivery of water in the end-of-irrigation zone $Z_F$ varies only over a depth of $\pm h_0/6$ relative to the desired depth of water $h_0$, whereas the variation would have been $\pm h_0/4$ if only two alternations were performed.

Thus, in order to tend towards uniform delivery of water over the entire irrigated area by applying this third approach, the start-of-irrigation zone $Z_D$ and the intermediate zone $Z_I$ are irrigated with the gun pointing in the opposite direction to the displacement direction of the carriage. In this case, the winder is placed at one end of the field and the hose is unwound at the beginning of irrigation over the entire length L of the field so as to position the carriage at the other end of the field. Overall, the same results are obtained as with the second approach, but in addition, the corner zones $Z_1$ and $Z_2$ of the start-of-irrigation zone $Z_D$ are also properly irrigated, however the hose has to be unwound over the entire length that is to be irrigated, i.e. there is no saving of a length of hose equal to the throw of the gun.

The method of the invention leads to several conclusions.

A first conclusion is that the trend towards water delivery that is as uniform as possible over the entire length of a field increases with increasing value for the parameter $n$. The first pause $T_1$ in the start zone $Z_D$ and the last pause Tn in the end zone $Z_F$ tend towards the value $(P/V_e)$ which corresponds to the desired depth of water delivery $h_0$ while the carriage is traveling one throw P at the speed $V_e$ in the intermediate zone $Z_I$.

A second conclusion is that the variations of $\pm h_0/2n$ in the delivery of water in the start and end zones $Z_D$ and $Z_F$ relative to the desired depth of water $h_0$ tend towards the value zero as the value of the parameter $n$ tends towards infinity.

A third conclusion is that using the above-specified formulae specifying the duration of the pauses and the speeds of irrigation in the start zone $Z_D$ and in the end zone $Z_F$, it can be shown that the additional durations of irrigation in these zones $Z_D$ and $Z_F$ compared with the duration of irrigation if the method is not applied, are constant whatever the value of the parameter $n$, and each is equal to $(1/2)(P/V_e)$ (where P is the length of one gun throw, and $V_e$ is the reference speed of irrigation in the intermediate zone $Z_I$ for obtaining the desired delivery of water to the depth $h_0$).

With reference to the start zone $Z_D$, it has been shown that for $i \in [1,n]$:

the $i^{th}$ pause has a duration $T_i$ such that:

$$T_i = \frac{2(n-i)+1}{2n} \times \frac{P}{V_e}$$

the $i^{th}$ irrigation speed $V_i$ is such that:

$$V_i = n/i \times V_e$$

As a result the duration $D_i$ for traveling over one throw P at the irrigation speed $V_i$ is such that:

$$D_i = \frac{i}{n} \times \frac{P}{V_e}$$

Consequently, the total duration $D_D$ of irrigation in the start zone $Z_D$ is such that:

$$D_D = \sum_{i=1}^{n} (T_i + D_i) = \left(n + \frac{1}{2}\right) \times \frac{P}{V_e}$$

Given that the length of the start zone that is processed for compensating water deficit is equal to $(n+1)\times P$, but with the carriage being displaced through $n$ throws only, the supplementary duration $D_S$ of irrigation compared with the duration of irrigation without applying the method over the same length irrigated at the speed $V_e$ is equal to:

$$D_S = \left(n + \frac{1}{2}\right) \times \frac{P}{V_e} - \frac{n \times P}{V_e}$$

$$D_S = \frac{1}{2} \times \frac{P}{V_e}$$

A similar calculation can be done to show that the supplementary duration of irrigation in the end zone $Z_F$ is also equal to $(1/2)(P/V_e)$ whichever approach is used.

A fourth conclusion that can be drawn from the preceding conclusion is that the total duration $D_T$ of irrigation of a field of length L when the method of the invention is applied is constant, whatever the value of the parameter $n$ and is equal to:

$$D_T = \frac{L}{V_e}$$

Specifically:
the total duration $D_T$ of irrigation of the same field without applying the method is equal to:

$$D_T = \frac{L-P}{V_e}$$

since the gun is unwound over a length L−P, and
the supplementary duration of irrigation of the same field when the method is applied is equal to $2 \times (1/2) (P/V_e)$.
In other words, the total duration of irrigation using the method of the invention is indeed:

$$D_T = \frac{L-P}{V_e} + \frac{P}{V_e} = \frac{L}{V_e}$$

Above, the method of the invention has been applied under the following conditions:
the maximum speed of the carriage which carries the water gun or the maximum speed of the hose winder is equal to $\underline{n}$ times the irrigation speed $V_e$ corresponding to a desired water throw; and
the parameter $\underline{n}$ is the integer part of the ratio $V_{max}/V_e$.

We consider the application of the method of the invention to compensating water deficit in the start zone $Z_D$.

1/ If $2 \leq \frac{V_{max}}{V_e} < 3$

Then, as shown in FIG. 5b, the parameter $\underline{n}$ has the value 2 and the following sequence is applied:

$$T_1 = \frac{3}{2} \times \frac{P}{V_e}; V_1 = 2V_e; T_2 = \frac{1}{4} \times \frac{P}{V_e}$$

with variations in water delivery of $(\pm h_0/4)$.

2/ If $3 \leq \frac{V_{max}}{V_e} < 4$

Then, as shown in FIG. 5c, the parameter $\underline{n}$ is given the value 3 and the following sequence is applied:

$$T_1 = \frac{5}{6} \times \frac{P}{V_e}; V_1 = 3V_e; T_2 = \frac{3}{6} \times \frac{P}{V_e}; V_2 = \frac{3}{2} V_e; T_3 = \frac{1}{6} \times \frac{P}{V_e}$$

with variations in water delivery of $(\pm h_0/6)$.

It is then possible to improve the method of the invention as described above by seeking to determine the irrigation speed lying in the range $2V_e$ to $3V_e$ (for the case where n=2) from which it will be possible to apply the first pause $T_1$ as defined when $\underline{n}$ is equal to 3.

When $\underline{n}$ is equal to 2, the first pause $T_1$ is equal to $(3/4) (P/V_e)$, which leads to variations in water delivery of $(\pm h_0/4)$. However, when $\underline{n}$ is equal to 3, the first pause $T_1$ is equal to $(5/6) (P/V_e)$ which leads to variations in water delivery of $(\pm h_0/6)$, i.e. a closer approach is obtained to the desired water delivery in the first throw of the start zone $Z_D$.

However, if it is desired to apply the first pause $T_1$ as defined for n=3 when the maximum irrigation speed lies in the range $2V_e$ to $3V_e$ (the case where n=2), variations in water delivery must not exceed $(\pm h_0/4)$ while the carriage travels over the second throw of the start zone $Z_D$ adding to the water already delivered in the first throw.

This puts a condition on the speed $V_x$ that the winder can be allowed to reach, namely:
the displacement speed $V_x$ applied to the carriage after the first pause $T_1$ is such that:

$$V_e \times (n-1) < V_{xmin} \leq V_x < n \times V_e$$

where $V_{xmin}$, i.e. the minimum possible speed $V_x$, satisfies the following formula:

$$V_{xmin} = V_e \times 2 \times \frac{n(n-1)}{2n-1}$$

To satisfy this condition, it is necessary for the second pause $T_x$ to satisfy the following inequality:

$$T_{xmin} = \frac{(2n-1)(n-2)}{2n(n-1)} \times \frac{P}{V_e} \leq T_x \leq \frac{2n-3}{2n} \times \frac{P}{V_e}$$

so that the carriage travels through the second throw after the irrigation duration Dn defined for the value $\underline{n}$ ($T_{xmin}$ corresponding to the speed of $T_x$ for $V_x = V_{xmin}$).
This duration of irrigation $D_n$ is such that:

$$D_n = T_1 + \frac{P}{V_1} + T_2$$

$$D_n = \left[\frac{2n-1}{2n} + \frac{1}{n} + \frac{2n-3}{2n}\right] \times \frac{P}{V_e}$$

$$D_n = \frac{2n-1}{n} \times \frac{P}{V_e}$$

However, this duration of irrigation $D_n$ must be equal to:

$$D_n = T_1 + \frac{P}{V_x} + T_x$$

so it can be deduced that:

$$T_x = \frac{2n-1}{2n} \times \frac{P}{V_e} - \frac{P}{V_x}$$

Also, the value of $T_{xmin}$ corresponds to $V_{xmin}$ so it can be deduced that:

$$T_{xmin} = \frac{2n-1}{2n} \times \frac{P}{V_e} - \frac{P}{V_{xmin}}$$

$$T_{xmin} = \frac{(2n-1)(n-2)}{2n(n-1)} \times \frac{P}{V_e}$$

In addition, since the value of $T_{xmax}$ corresponds to $V_{max} = nV_e$, it can be deduced that:

$$T_{xmax} = \frac{2n-1}{2n} \times \frac{P}{V_e} - \frac{P}{nV_e}$$

$$T_{xmax} = \frac{2n-3}{2n} \times \frac{P}{V_e}$$

This value for $T_{xmax}$ does indeed correspond to the value of the second pause $T_2$ for the value $\underline{n}$.
Thus, returning to the case where the maximum speed of the carriage lies in the range $2V_e$ to $3V_e$, the following are defined:

an irrigation speed $V_{xmin}=(12/5)V_e$; and a minimum duration $T_{xmin}=(5/12)(P/V_e)$.

Under these conditions, when the maximum speed of the carriage lies in the range $2V_e$ to $3V_e$, and when it has a minimum value equal to $(12/5)V_e$, it is possible to apply the following sequence to compensate the water deficit in the start zone $Z_D$:

a first pause $T_1$ equal to $(5/6)(P/V_e)$ which corresponds to the pause $T_1$ for n=3;

a speed of irrigation $V_1=V_x$ which is greater than or equal to $(12/5)V_e$;

a second pause $T_2$ greater than or equal to $(5/12)(P/V_e)$;

an irrigation speed $V_2$ equal to $(3/2)V_e$ which corresponds to the speed $V_2$ for n=3; and a third pause $T_3$ equal to $(1/6)(P/V_e)$ which corresponds to the pause $T_3$ for n=3, i.e. the following sequence:

$$T_1 = \frac{5}{6} \times \frac{P}{V_e}; V_1 \geq \frac{12}{5} V_e;$$

$$T_2 = \frac{5}{12} \times \frac{P}{V_e}; V_2 = \frac{3}{2} \times \frac{P}{V_e}; T_3 = \frac{1}{6} \times \frac{P}{V_e}$$

This improvement to the method of compensating water deficit in the start zone $Z_D$ can be specified in terms of three rules when the maximum irrigation speed for carriage displacement or hose winding onto the winder lies in the range $(n-1)V_e$ to $nV_e$, for $V_e$ being the speed corresponding to the desired water delivery:

Rule 1: apply the first pause $T_1$ corresponding to the value $\underline{n}$, i.e.:

$$T_1 = \frac{2n-1}{2n} \times \frac{P}{V_e}$$

Rule 2: ensure that water delivery does not exceed that which corresponds to the value (n−1), which implies a speed $V_x$ for application to the carriage after the first pause $T_1$ whose value lies in the range:

$$V_{xmin} = V_e \times 2\frac{n(n-1)}{2n-1} \leq V_x < nV_e$$

Rule 3: begin the displacement of the carriage for traveling over the second throw at the instant defined for the value $\underline{n}$, which implies a second pause $T_x$ whose value lies in the range:

$$T_{xmin} = \frac{(2n-1)(n-2)}{2n(n-1)} \times \frac{P}{V_e} \leq T_x \leq \frac{2n-3}{2n} \times \frac{P}{V_e}$$

This improvement to the method as specified by the three above rules can also be applied to compensate for deficit in water delivery in the end zone $Z_F$.

For the first two approaches envisaged above for the end zone $Z_F$, the three rules become the following when the maximum speed of the carriage lies in the range $(n-1)V_e$ and $nV_e$:

Rule 1: apply the $n^{th}$ pause $T_n$ corresponding to the value $\underline{n}$, i.e.:

$$T_n = \frac{2n-1}{2n} \times \frac{P}{V_e}$$

Rule 2: ensure that water delivery does not exceed that which corresponds to the value (n−1), which implies a speed $V_x$ whose value must lie in the range:

$$V_{xmin} = V_e \times 2\frac{n(n-1)}{2n-1} \leq V_x < nV_e$$

Rule 3: modify only the pause corresponding to the value (n−1) so as to keep the total duration of the arrival sequence constant and such that:

$$T_{n-1} = \frac{(2n-1)}{2n} \times \frac{P}{V_e} - \frac{P}{V_x}$$

When the third approach is used, the displacement speeds $V_1$ and $V_2$ during the first two alternations ($\underline{n}$ being not less than 2), are equal and such that:

$$V_1 = V_2 = \frac{(2n-1)}{2n} \times V_e$$

The above-stated three rules can be applied only for a value of $\underline{n}$ not less than 4 (n≧4), i.e. a speed $V_x \geq (24/7)V_e$.

For $\underline{n}$ having values of 2 and 3, the speeds $V_1$ and $V_2$ are greater than or equal to $nV_e$.

In which case, the improvement will be as follows for a carriage speed $V_x$ lying in the range:

$$4/3 < V_x < 3V_e$$

Rule 1: on beginning the end zone $Z_F$, travel through the throw in the displacement direction at the speed $V_x$;

Rule 2: before traveling through the second throw in the direction opposite to the displacement direction, make a pause $T_{x1}$ equal to one-fourth of the time that remains relative to the normal duration taken to travel through the two throws in accordance with the method, i.e. at a speed of $4V_e$; and Rule 3: at the end of traveling through the second throw, make a pause $T_{x2}$ equal to $3T_{x1}$.

Finally, all of the formulae given above are based on the assumption that variation in flow rate is negligible, and regulation has been performed on the basis of time. The formulae need to be corrected by $\Delta T_i$ and $\Delta V_i$ when regulation is performed on the basis of measuring flow rate.

What is claimed is:

1. A method of optimizing water delivery to cultivated fields by means of a high flow rate water gun, the method consisting in connecting the gun to the free end of a hose connected to a water supply source, in mounting the gun to pivot on a moving carriage, in unwinding the hose over a certain length from the drum of a winder so as to enable the gun to be moved away, and in rotating the drum so as to wind the hose in progressively and displace the carriage towards the drum while the gun is delivering water by performing successive sweeps over an angular sector of radius equal to one gun throw, the method being characterized in that it consists, for irrigating a field of length (L) and of width equal to twice the throw (P) of the gun:

in subdividing the irrigation zone into three successive zones, namely: a start-of-irrigation zone ($Z_D$), an intermediate zone ($Z_I$) where the gun travels at a reference speed ($V_e$) corresponding to the desired water delivery, and an end-of-irrigation zone ($Z_F$); and in irrigating the start-of-irrigation zone ($Z_D$) and/or the end-of-irrigation zone ($Z_F$) by performing at least one alternation of a pause during which the carriage is stationary and a displacement of the carriage at a predetermined speed over a distance corresponding to one throw of the gun, or possibly vice versa in the end-of-irrigation zone, so as to optimize water delivery compared with the delivery supplied in the intermediate zone, i.e. so that the supply of water is as uniform as possible over the entire irrigated area.

2. A method according to claim 1, characterized in that in order to limit water deficit in the start-of-irrigation zone ($Z_D$), the method consists in performing alternations of pauses and displacements ($T_1$, $V_1$; $T_2$, $V_2$; ..., $T_n$, $V_n$), such that:

the duration of each pause $T_i$ is defined using the equation:

$$T_i = \frac{2(n-i)+1}{2n} \times \frac{P}{V_e}$$

where:

$i$ lies in the range [1,n];

$n$ is the integer number of possible alternations, and is such that $n$=the integer portion of ($V_{max}/V_e$);

$V_{max}$ is the maximum speed at which the hose can be wound in;

$V_e$ is the reference speed of displacement for the carriage corresponding to the desired water delivery;

P is the throw of the gun; and each displacement speed $V_i$ of the carriage, after a pause, is defined from the equation:

$$V_i = n/i \times V_e$$

3. A method according to claim 2, characterized in that it consists in positioning the carriage at one gun throw from the start of the start-of-irrigation zone ($Z_D$) when the gun points in the direction opposite to the displacement direction of the carriage, or in placing the carriage at the start of the start-of-irrigation zone ($Z_D$) when the gun is pointed in the displacement direction of the carriage.

4. A method according to claim 2, characterized in that it consists, when the maximum speed of the carriage lies in the range $(n-1)V_e$ and $nV_e$:

in applying the first pause $T_1$ corresponding to the value $n$, i.e.:

$$T_1 = \frac{2n-1}{2n} \times \frac{P}{V_e}$$

in ensuring that water delivery does not exceed that which corresponds to the value (n−1), which implies a speed $V_x$ for application to the carriage after the first pause $T_1$ and whose value lies in the range:

$$V_{xmin} = V_e \times 2\frac{n(n-1)}{2n-1} \leq V_x \leq nV_e$$

in beginning the displacement of the carriage for traveling over the second throw at the instant defined for the value $n$, which implies a second pause $T_x$ whose value lies in the range:

$$T_{xmin} = \frac{(2n-1)(n-2)}{2n(n-1)} \times \frac{P}{V_e} \leq T_x \leq \frac{2n-3}{2n} \times \frac{P}{V_e}.$$

5. A method according to claim 1, characterized in that, in order to limit water deficit in the end-of-irrigation zone ($Z_F$), the method consists in performing alternations of pauses and displacements or vice versa, such that:

the duration of each pause $T_i$ is defined by the equation:

$$T_i = \frac{2i-1}{2n} \times \frac{P}{V_e}$$

and each displacement speed $V_i$ of the carriage after a pause is defined by the equation:

$$V_i = \frac{n}{(n-i+1)} \times V_e.$$

6. A method according to claim 5, characterized in that it consists in performing alternations of pauses and displacements ($T_1$, $V_1$; $T_2$, $V_2$; ...; $T_n$, $V_n$), the gun being pointed in the displacement direction of the carriage during the pauses and in the opposite direction during the displacements of the carriage, the carriage being displaced all the way to the end of the end-of-irrigation zone.

7. A method according to claim 6, characterized in that it consists in irrigating the start-of-irrigation zone ($Z_D$) and the intermediate zone ($Z_I$) with the gun pointing in the direction opposite to the displacement direction of the carriage, and in making the end-of-irrigation zone ($Z_F$) begin at $n$ gun throws from the end of the field.

8. A method according to claim 5, characterized in that it consists in causing the end-of-irrigation zone ($Z_F$) to begin at (n+1) gun throws from the end of the field, in causing the carriage to be displaced at a speed ($V_1$) during the first throw, then causing alternations of displacements and pauses ($V_2$, $T_1$; $V_3$, $T_2$; ..., $V_n$, $T_{n-1}$) to be performed, the gun pointing in the displacement direction of the carriage during the displacements thereof and in an opposite direction during the pauses, and in terminating by a pause ($T_n$) once the carriage has reached one gun throw from the end of the end-of-irrigation zone with the gun pointing in the carriage displacement direction.

9. A method according to claim 8, characterized in that it consists in irrigating the start-of-irrigation zone and the intermediate zone with the gun pointing in the displacement direction of the carriage.

10. A method according to claim 5, characterized in that it consists, when the maximum speed of the carriage lies in the range $(n-1)V_e$ to $nV_e$:

in applying the $n^{th}$ pause $T_n$ corresponding to the value $n$, i.e.:

$$T_n = \frac{2n-1}{2n} \times \frac{P}{V_e}$$

in ensuring that water delivery does not exceed that which corresponds to the value (n−1), which implies a speed $V_x$ whose value must lie in the range:

$$V_{xmin} = V_e \times 2\frac{n(n-1)}{2n-1} \leq V_x < nV_e$$

in modifying only the pause corresponding to the value (n−1) so as to keep the total duration of the arrival sequence constant and such that:

$$T_{n-1} = \frac{(2n-1)}{2n} \times \frac{P}{V_e} - \frac{P}{V_x}.$$

11. A method according to claim 5, characterized in that, for a number of alternations not less than 2, the method consists in performing alternations of displacements and pauses ($V_1, T_1; V_1, T_2; \ldots; V_n, T_n$) the gun being pointed in the direction opposite to the displacement direction of the carriage both during the displacements thereof and during the pauses, while the displacement of the carriage during the first alternation takes place with the gun pointing in the displacement direction of the carriage, the displacement speeds ($V_1$ and $V_2$) during the first two alternations being such that:

$$V_1 = V_2 = \frac{2n}{n-1} \times V_e.$$

12. A method according to claim 11, characterized in that it consists in irrigating the start-of-irrigation zone ($Z_D$) and the intermediate zone ($Z_I$) with the gun pointing in the displacement direction of the carriage, and in causing the end-of-irrigation zone ($Z_F$) to begin at n throws of the gun from the end of the field.

13. A method according to claim 9, characterized in that it consists, when the maximum speed of the carriage lies in the range (n−1)$V_e$ to n$V_e$ for n≧4:

in applying the $n^{th}$ pause $T_n$ corresponding to the value n, i.e.:

$$T_n = \frac{2n-1}{2n} \times \frac{P}{V_e}$$

in ensuring that water delivery does not exceed that which corresponds to the value (n−1), which implies a speed $V_x$ whose value must lie in the range:

$$V_{xmin} = V_e \times 2\frac{n(n-1)}{2n-1} \leq V_x < nV_e$$

in modifying only the pause corresponding to the value (n−1) so as to keep the total duration of the arrival sequence constant and such that:

$$T_{n-1} = \frac{(2n-1)}{2n} \times \frac{P}{V_e} - \frac{P}{V_x}.$$

14. A method according to claim 11, characterized in that it consists, when the speed of the carriage $V_x$ lies in the range (4/3)$V_e$ to 3$V_e$:

on beginning the end zone $Z_F$, in traveling through the throw in the displacement direction at the speed $V_x$;

before traveling through the second throw in the direction opposite to the displacement direction, in making a pause $T_{x1}$ equal to one-fourth of the time that remains relative to the normal duration taken to travel through the two throws in accordance with the method, i.e. at a speed of 4$V_e$; and at the end of traveling through the second throw, in making a pause $T_{x2}$ equal to 3$T_{x1}$.

* * * * *